(No Model.)

J. W. HYATT.
CEMENT FILTER.

No. 369,718.  Patented Sept. 13, 1887.

Attest:  Inventor.
Jas Hodge  John W. Hyatt per
George L. Holliday  Crane & Miller, Attys.

UNITED STATES PATENT OFFICE.

JOHN W. HYATT, OF NEWARK, NEW JERSEY, ASSIGNOR TO THE HYATT PURE WATER COMPANY, OF SAME PLACE.

CEMENT FILTER.

SPECIFICATION forming part of Letters Patent No. 369,718, dated September 13, 1887.

Application filed January 3, 1887. Serial No. 223,287. (No model.)

*To all whom it may concern:*

Be it known that I, JOHN W. HYATT, a citizen of the United States, residing at Newark, Essex county, New Jersey, have invented certain new and useful Improvements in Cement Filters, fully described and represented in the following specification and the accompanying drawings, forming a part of the same.

The object of this invention is to construct from hydraulic cement a porous substance for use in filter plates or beds; and the improvement consists in molding the dry powder into the desired form and applying part of the needed water to the cement without stirring or agitating the same. I have discovered that the bulk of the cement is very much diminished by wetting and stirring in the usual way to mix the powder with water, and considered that such diminution of bulk must obliterate many pores which would exist between the particles before such wetting. I therefore ascertained the means necessary to set or harden the cement without agitation, and find that the pores then remain open sufficiently to form the substance into a filter plate or bed of very fine and perfect character, and the bulk of the cement remaining substantially the same as when in powder. Two means for thus hardening the cement are shown herein, one consisting in the use of porous paper between the cement and a layer of water and the other in a steam box or chamber in which the cement is gradually moistened.

Figure 1:
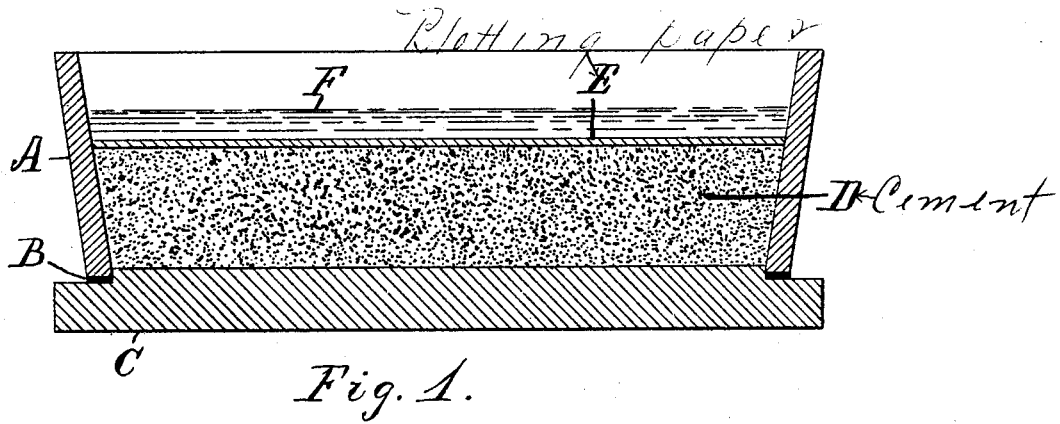
Figure 2:
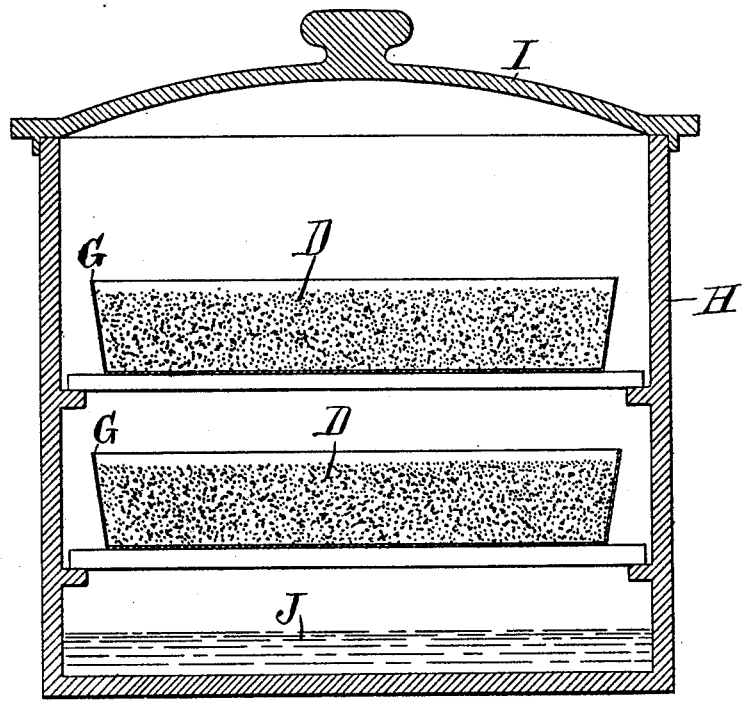

The annexed drawings show these different means for thus hardening the cement, Figure 1 being a vertical section of a mold resting upon a bed-plate, and Fig. 2 being a vertical section of a mold inclosed in a steam-box.

In Fig. 1, A is the mold, formed with open bottom and resting upon a packing-ring, B, on a bed-plate, C. D is a layer of cement packed in the bottom of the mold to the required thickness. E is a layer of blotting-paper or porous fabric resting upon the surface of the cement, and F is a layer of water poured over the porous fabric to percolate slowly through the same. I have found that when a part only of the needed water is allowed to thus slowly percolate into the cement without agitation the latter becomes gradually moistened without settling, and is consolidated into a porous plate or block, through which water may be readily filtered.

It is well known that hydraulic cement is impervious to moisture or fluid when stirred with water and then allowed to set, and the porous character of the cement when treated by my process is secured by applying to the cement only sufficient water to attach the particles together without floating any of them in fluid or causing them to flow into closer contact with one another. Such partial wetting of the cement hardens the material sufficiently in about a day's time to retain its porous character when supplied with the remainder of the water of crystallization necessary to fully hydrate the cement.

As cement requires a larger quantity of water to fully hydrate it than is necessary to make it retain a fixed form, it is plain that the first essential of my process is to limit the quantity of water applied below the hydrating point, and to set or harden the cement in a porous state before applying the remainder. The second essential is to apply the moisture slowly and without agitation, to avoid moving the particles into close contact. While a porous pad, like the paper E, thus applies the fluid, it may be otherwise applied, as shown in Fig. 2, which is a kind of vapor bath. In this figure, G are molds for the cement, and H is a steam box or casing provided with a cover, I, to retain steam in contact with the cement. The steam may be generated by placing water, J, in the box around the mold and heating the box to vaporize it, or the vapor may be furnished by a steam-jet. The vapor when raised from the water is absorbed by the cement, and the latter is hardened by a liberal wetting with water after it is thus moistened and solidified without the change of bulk and closing of its pores that results when the cement is fully wet and stirred.

Other means may obviously be devised to moisten the cement without agitation, as by throwing a fine spray upon the surface of the cement from a vaporizer or by other suitable means.

The hydraulic cement consists of a mixture of particles varying very much in size, and the interstices between such particles must correspondingly vary. To constitute a finer filtering medium the coarser particles may be sifted or otherwise removed from the cement (as by regrinding) and the remainder treated with moisture, as herein described.

The filter-plates formed by my invention are so fine that the impurities are deposited wholly upon the surface, and the bed is therefore readily and effectively cleansed by a surface washing. I do not, therefore, limit myself to any special means of carrying into effect my discovery and invention.

I disclaim herein the porous composition formed of hydraulic cement with the finer particles removed, as I have claimed the same in my prior patent application, No. 221,678, filed December 15, 1886.

I may remove the coarser particles in practicing my present invention; but in any case the material I use would consist mainly of the finer particles and my methods operate to harden the same with the natural interstices between them.

The filter plates or beds formed by my process may be used in any suitable receptacle or casing, and it is obvious that a filter-bed may be thus formed in the bottom of a reservoir or receptacle, where it would remain in performing its intended functions.

Having thus set forth my invention, what I claim is—

1. The method herein described for forming porous filter plates or beds of hydraulic cement, consisting in the application to the cement of a part of the water of crystallization; secondly, in the partial hardening of the same in a porous condition, and, thirdly, in the application of the remainder of the water required to hydrate the cement, as and for the purpose set forth.

2. The method of forming porous filter beds or plates of hydraulic cement, which consists in the slow and gradual application of moisture to the cement without agitation, as and for the purpose set forth.

3. The method of forming porous filter beds or plates of hydraulic cement, consisting in the slow and gradual application of vapor or spray to the cement, as and for the purpose set forth.

In testimony whereof I have hereunto set my hand in the presence of two subscribing witnesses.

JOHN W. HYATT.

Witnesses:
FRANK L. MOUTON,
THOS. S. CRANE.